United States Patent

Sakata

(10) Patent No.: US 7,652,403 B2
(45) Date of Patent: Jan. 26, 2010

(54) MOTOR ASSEMBLY USABLE FOR AN OUTER MOTOR OF A VEHICLE

(75) Inventor: Ikuo Sakata, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 47 days.

(21) Appl. No.: 11/866,208

(22) Filed: Oct. 2, 2007

(65) Prior Publication Data

US 2008/0247070 A1    Oct. 9, 2008

(30) Foreign Application Priority Data

Oct. 3, 2006    (JP) .............................. 2006-271426

(51) Int. Cl.
*H02K 11/00*    (2006.01)
(52) U.S. Cl. ........................................ 310/71; 359/877
(58) Field of Classification Search ............... 310/71, 310/91; 335/272; 359/877
See application file for complete search history.

(56) References Cited

U.S. PATENT DOCUMENTS

| | | | | |
|---|---|---|---|---|
| 4,398,135 A | * | 8/1983 | Busch et al. ................ | 318/443 |
| 5,781,354 A | * | 7/1998 | Sakata ......................... | 359/841 |
| 6,755,544 B2 | * | 6/2004 | Schnell et al. ............... | 359/877 |
| 6,793,358 B2 | * | 9/2004 | Sakata ......................... | 359/872 |
| 2004/0061391 A1 | | 4/2004 | Matsuyama et al. | |

FOREIGN PATENT DOCUMENTS

| | | |
|---|---|---|
| DE | 40 19 787 A1 | 1/1991 |
| JP | 2004-155367 A | 6/2004 |
| JP | 2004-237817 A | 8/2004 |

\* cited by examiner

*Primary Examiner*—Michael C Zarroli
(74) *Attorney, Agent, or Firm*—Foley & Lardner LLP

(57) ABSTRACT

A motor assembly includes a motor, a circuit board on which a control circuit to control the motor and a plug unit are mounted, and a supporting member which supports the motor and the circuit board. The motor is provided with a socket unit in which the plug unit is fitted. The supporting member has a board supporting portion to support the circuit board, a motor supporting portion to support the motor, and a supporting member engagement portion. The plug unit has a plug unit engagement portion which is engaged with the supporting member engagement portion. The plug unit engagement portion is engaged with the supporting member engagement portion when the plug unit is fitted in the socket unit.

9 Claims, 14 Drawing Sheets

MOTOR ASSEMBLY USABLE FOR AN OUTER MOTOR OF A VEHICLE

CROSS REFERENCE TO RELATED APPLICATIONS

This application is based on and claims priority from Japanese Patent Application No. 2006-271426, filed on Oct. 3, 2006, the disclosure of which is incorporated herein by reference in its entirety.

BACKGROUND OF THE INVENTION

1. Field of the Invention

The present invention relates to a motor assembly used in an outer mirror driving apparatus to turn an outer mirror for a vehicle between a position in which the outer mirror is in a position to be used and a position in which the outer mirror is in a position not to be used.

2. Description of the Related Art

An outer mirror driving apparatus to drive an outer mirror between a position in which the outer mirror is in a position to be used and a position in which the outer mirror is in a position not to be used has been known.

A disk-shaped mirror joining portion configured to be turned within a predetermined angle range is provided on a top portion of the outer mirror driving apparatus.

A disk-shaped base portion is joined on a lower portion of the outer mirror of a vehicle and the base portion is fixed to the mirror joining portion with bolts.

The outer mirror driving apparatus is configured to turn the mirror joining portion so that the outer mirror is turned between a position in which the outer mirror is in a position to be used and a position in which the outer mirror is in a position not to be used.

The outer mirror driving apparatus has a mirror turning shaft, a power transmission mechanism, and a motor assembly.

The mirror joining portion is joined together on an upper end portion of the mirror turning shaft, and the power transmission mechanism having gears, or the like is configured to transmit power from the motor assembly to the mirror turning shaft.

The motor assembly has a motor as a power source, a circuit board on which a control circuit to control the motor is mounted, and a supporting member to fix the motor, the circuit board, and the like.

Harnesses to feed power to the motor are connected to the circuit board, and extend outwardly to an outside of the outer mirror driving apparatus.

A pair of threaded holes are provided on a chassis wall of the motor, in which a driving shaft is projected, so that the motor can be threadably fixed with the pair of screws.

Electrodes of the motor and the circuit board are connected to each other with a pair of lead wires fixed by soldering.

A motor fixing portion and a board supporting portion are formed together on the supporting member, and a driving shaft hole in which the driving shaft of the motor is inserted is provided. A pair of threaded holes are provided on both sides of the driving shaft hole.

A pair of notched portions are provided on the board supporting portion at an interval corresponding to a width of the circuit board and are configured to be engaged with both corners of one end of the circuit board so that the circuit board is supported.

Screws are inserted in the pair of threaded holes provided on the motor fixing portion in a state where the driving shaft of the motor is inserted in the driving shaft hole, and screwed in threaded holes of the motor to fix the motor.

The pair of corners of the circuit board are engaged with the pair of notched portions. The circuit board is fixed on the board supporting portion in a state where the circuit board is disposed at an interval in relation to the motor.

A gear or the like is fixed to the motor and the assembled motor assembly is installed in the outer mirror driving apparatus.

At this time, the circuit board is engaged to be fixed with board locking portions provided in an inside of a case of the outer mirror driving apparatus.

Similarly to the above outer mirror driving apparatus, an electric-powered storing door mirror has been known (see, for example, Japanese Application Publication Number 2004-237817)

However, in conventional motor assemblies, the motor and the circuit board are required to be preliminarily connected to each other with lead wires, and screws are needed to fix the motor. Consequently a connecting process to connect the motor to the circuit board, a fixing process to fix the motor with screws, and the like are required so that production efficiency is decreased due to an increased number of assembling processes.

Moreover, since the lead wires are connected by soldering and the screws are used to fix the motor, there is a problem in that the production cost is increased due to the need for an increasing number of connecting parts.

Furthermore, since only one end of the circuit board is engaged to allow the circuit board to be supported on the supporting member and the circuit board is connected to the motor with the lead wires, the circuit board is fixed to the motor in an unstable state.

Accordingly, if the lead wires are moved when the motor assembly is installed in the case of the outer mirror driving apparatus, the circuit board is also moved so that there is a risk that the circuit board is detached from the board locking portions, the notched portions, or the like.

In addition, if the motor assembly is installed in the outer mirror driving apparatus in a state where the circuit board is detached, there is a risk of the occurrence of a short-circuiting of the control circuit due to interference of the circuit board and the case of the outer mirror driving apparatus, or the like when the outer mirror driving apparatus is used.

SUMMARY OF THE INVENTION

An object of the present invention is to provide a motor assembly which can be easily assembled, and in which a motor and a circuit board can be fixed easily and stably without fixing members or the like.

To achieve the above object, a motor assembly according to an embodiment of the present invention includes a motor provided with a socket unit, a circuit board on which a control circuit to control the motor and a plug unit are mounted, and a supporting member which supports the motor and the circuit board. The supporting member has a board supporting portion which supports the circuit board and a motor fixing portion which supports the motor and a supporting member engagement portion. The plug unit has a plug unit engagement portion which is engaged with the supporting member engagement portion. The plug unit engagement portion is engaged with the supporting member engagement portion when the plug unit is fitted to the socket unit.

DETAILED DESCRIPTION OF THE PREFERRED EMBODIMENTS

Preferred embodiments of a motor assembly will be explained in detail with reference to the accompanying drawings below. A motor assembly according to an embodiment of the present invention may be used in, for example, an outer mirror driving apparatus for a vehicle.

(Structure of Outer Mirror Driving Apparatus)

Figure 1:
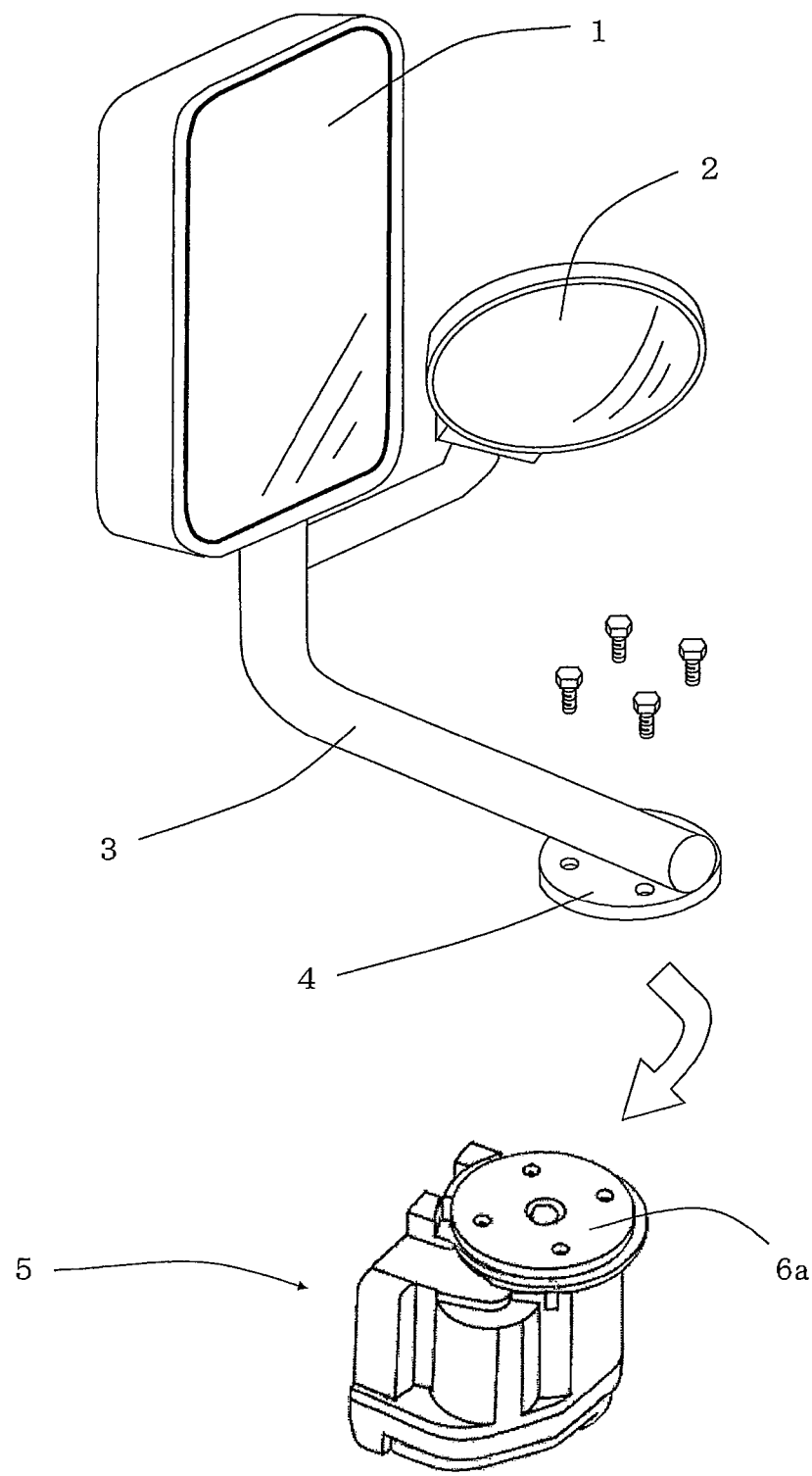
FIG. 1 is a perspective view showing an outer mirror driving apparatus in which a motor assembly according to an embodiment of the present invention is installed and an outer mirror which is configured to be turned by the outer mirror driving apparatus.

FIG. 1 shows an outer mirror driving apparatus 5 using a motor assembly according to an embodiment of the present invention, an outer mirror 1 for a vehicle, an assistant mirror 2, a stay portion 3, and a joining base portion 4. A disk-shaped mirror joining portion 6a is provided on a top portion of the outer mirror driving apparatus 5.

The outer mirror 1 for a vehicle and the assistant mirror 2 are mounted on a top portion of the substantially L-shaped stay portion 3. The disk-shaped joining base portion 4 is joined on a lower portion of the stay portion 3.

The joining base portion 4 is fixed on the mirror joining portion 6a of the outer mirror driving apparatus 5 with bolts.

The outer mirror driving apparatus 5 is configured to turn the mirror joining portion 6a such that the outer mirror 1 for a vehicle is turned between a position in which the outer mirror is in a position to be used and a position in which the outer mirror is in a position not to be used.

Figure 2:
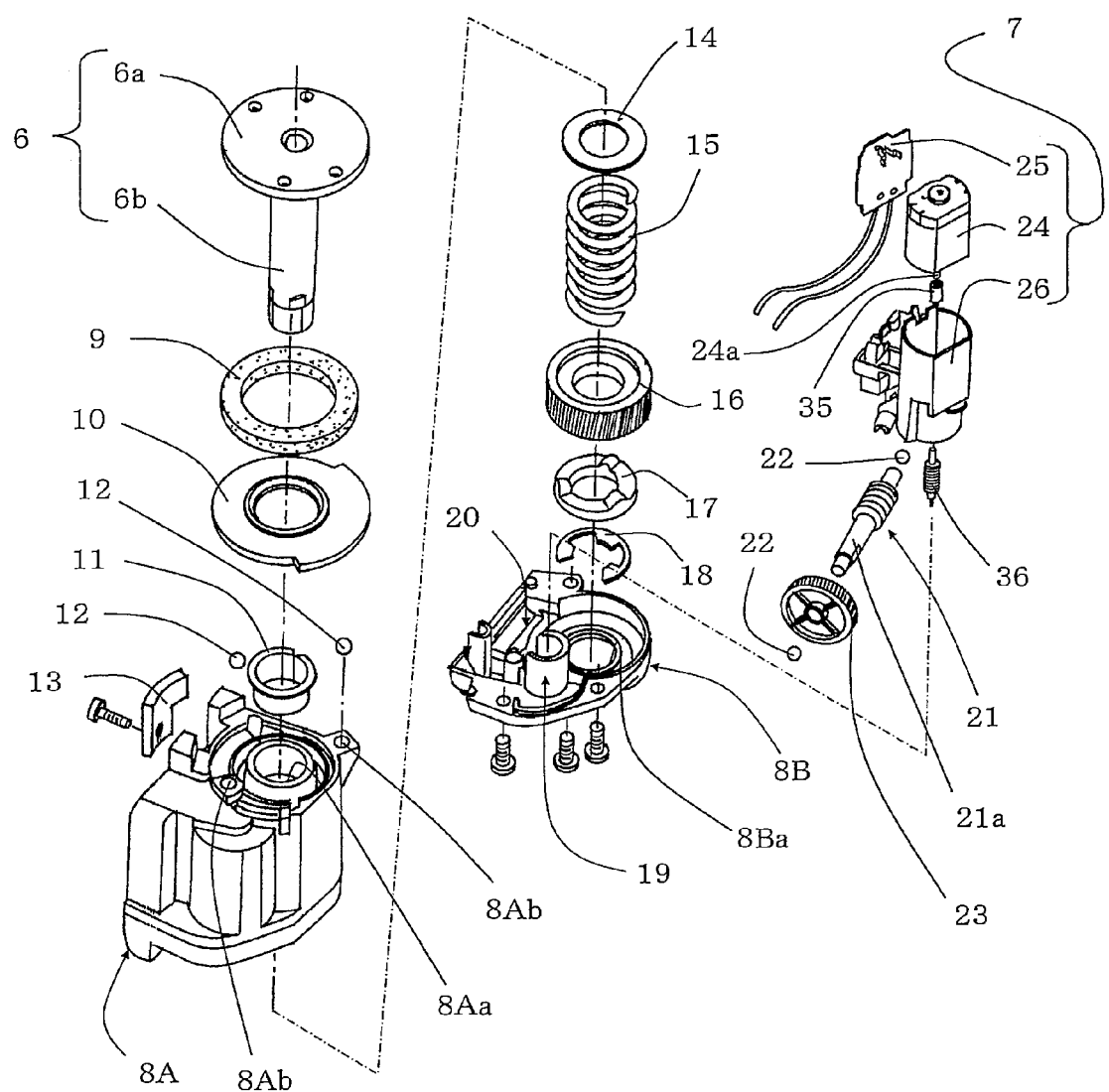
FIG. 2 is an exploded perspective view showing an outer mirror driving apparatus in which a motor assembly according to an embodiment of the present invention is used.

FIG. 2 shows a configuration of the outer mirror driving apparatus 5 having the motor assembly 7 according to an embodiment of the present invention as a power source. The outer mirror driving apparatus 5 also has a mirror turning shaft 6, a power transmission mechanism to transmit the power from the motor assembly 7 to the mirror turning shaft 6, and cases 8A, 8B to contain the above components.

The mirror turning shaft 6 has the mirror joining portion 6a and a shaft portion 6b, and the mirror joining portion 6a is joined on a top end of the shaft portion 6b.

The power transmission mechanism is formed of a gear, a spring, or the like, and is configured to transmit the power from the motor assembly 7 to the mirror turning shaft 6 so that the mirror turning shaft 6 is turned.

The shaft portion 6b of the mirror turning shaft 6 is inserted in a gland 9, a plate 10, and a bush 11 in order, and passes through a shaft hole 8Aa provided on the upper case 8A.

A pair of ball supporting portions 8Ab, 8Ab are provided on both sides of the shaft hole 8Aa of the case 8A. A bearing ball 12 is disposed rotatably on each of the ball supporting portions 8Ab, 8Ab and the bearing balls 12, 12 are placed between the plate 10 and the case 8A.

A stopper member 13, which interferes with the plate 10 to limit a turning angle of the plate 10, is provided on a top portion of the case 8A.

Inside the case 8A, the shaft portion 6b is inserted in a washer 14, a spring 15, a clutch gear 16, and a clutch holder 17, and is provided with an F shaped ring 18. Consequently, the mirror turning shaft 6 is disposed rotatably in the shaft hole 8Aa of the case 8A.

A shaft hole 8Ba which receives a lower end portion of the mirror turning shaft 6, a motor assembly receiving portion 19 which receives the motor assembly 7, and a worm gear receiving portion 20 are provided on the lower case 8B. A worm gear 21 is fitted in the worm gear receiving gear 20.

The worm gear 21 has a shaft 21a, and a helical gear 23 is provided on the shaft 21a.

A concave portion is formed on each of the ends of the shaft 21a, and a ball 22 is disposed to abut each of the concave portions.

The motor assembly 7 has a motor 24 as a power source. A driving shaft 24a of the motor 24 is provided with a worm gear 36 via a joint 35.

The motor assembly 7 is mounted on the motor assembly receiving portion 19, and the upper case 8A and the lower case 8B are fixed to each other with screws.

A turning force of the motor 24 is transmitted to the helical gear 23 via the worm gear 36. The turning force is then transmitted to the clutch gear 16 via the worm gear 21 to form a turning force to turn the mirror turning shaft 6.

(Configuration of Motor Assembly)

Figure 3:
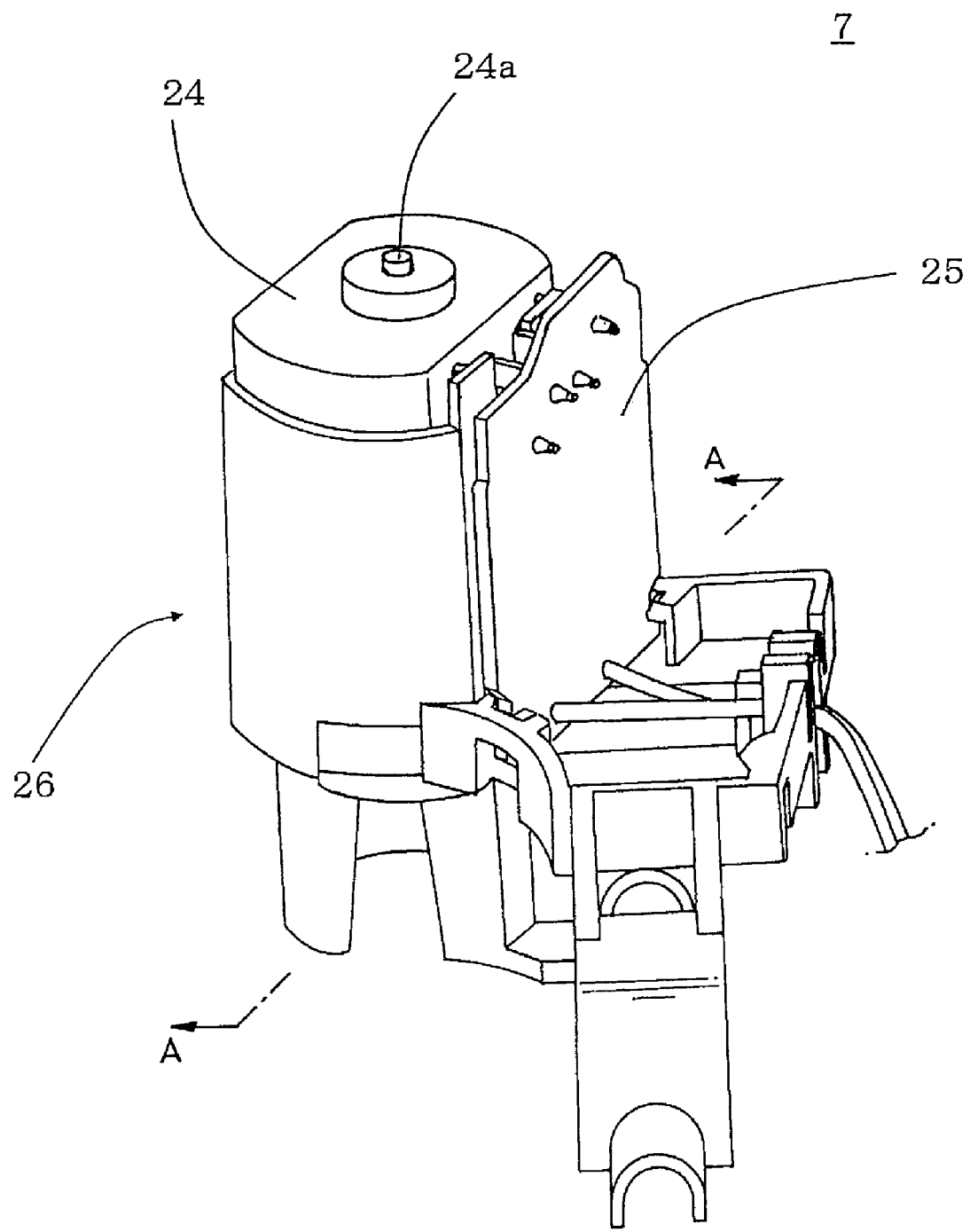
FIG. 3 is a perspective view showing a motor assembly according to an embodiment of the present invention.

Configurations of the motor assembly 7 according to an embodiment of the present invention will be explained. As shown in FIG. 3, the motor assembly 7 according to an embodiment of the present invention includes the motor 24 provided with a socket unit, a circuit board 25 on which a control circuit to control the motor 24 and a plug unit are mounted, and a supporting member 26 which supports the motor 24 and the circuit board 25.

Figure 4:
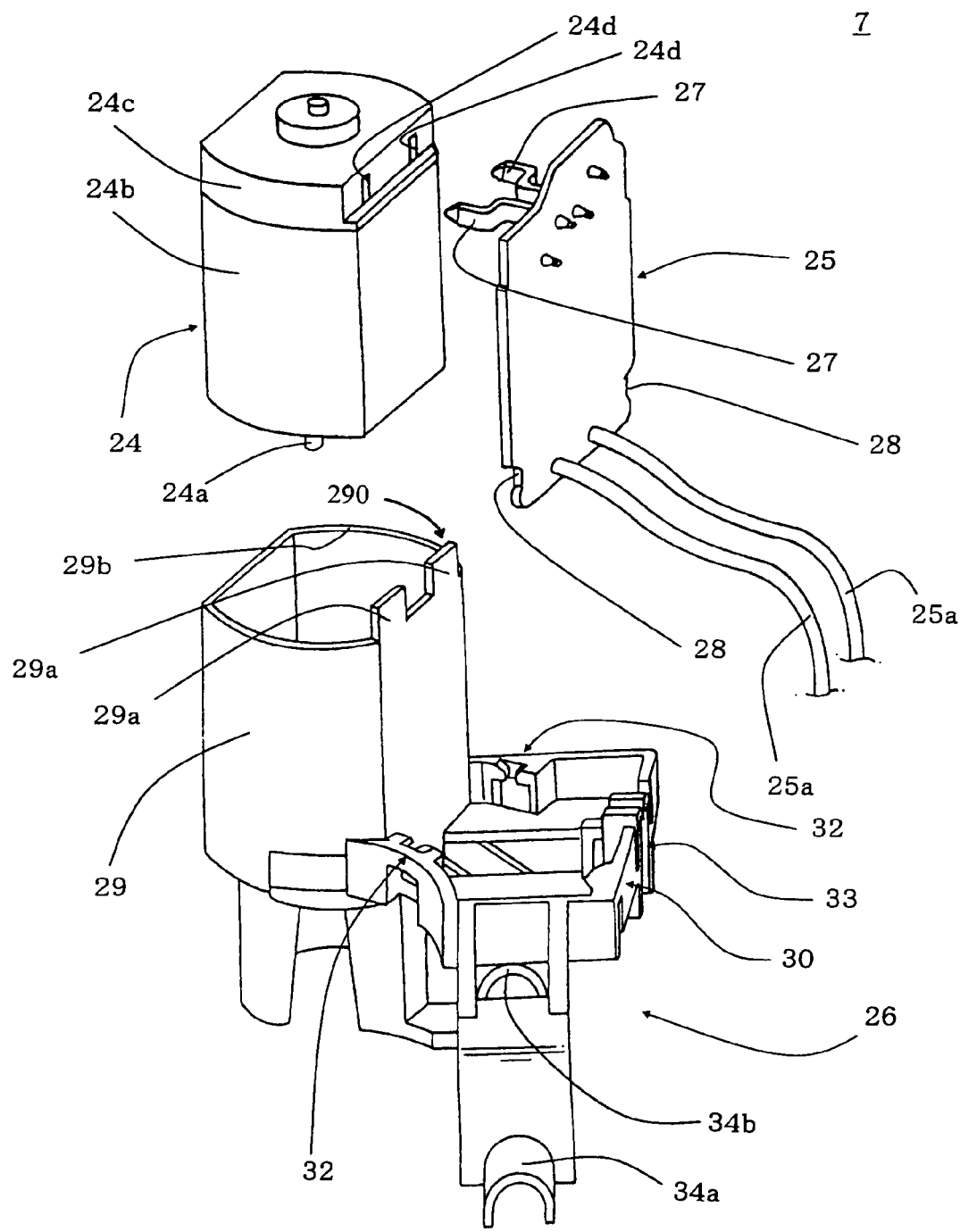
FIG. 4 is an exploded perspective view showing a motor assembly according to an embodiment of the present invention.

As shown in FIG. 4, the motor 24 has the driving shaft 24a, a case portion 24b, and a cap portion 24c. A pair of electrode socket portions 24d, 24d, the pair corresponding to the socket unit are provided on the cap portion 24c.

A pair of electrode terminals 27, 27, the pair corresponding to the plug unit are provided, for example, to stand in a thickness direction of the circuit board on one surface of the circuit board 25. Harnesses such as lead wires 25a, 25a are mounted on the other surface of the circuit board 25.

The pair of electrode terminals 27, 27 of the circuit board 25 are inserted and fitted, for example, in the thickness direction of the circuit board to the pair of the electrode socket portions 24d, 24d of the motor 24, respectively.

In addition to the electrode terminals 27, 27, a plurality of electronic parts (not shown) such as the control circuit, and the like are mounted on the circuit board 25.

Figure 5:
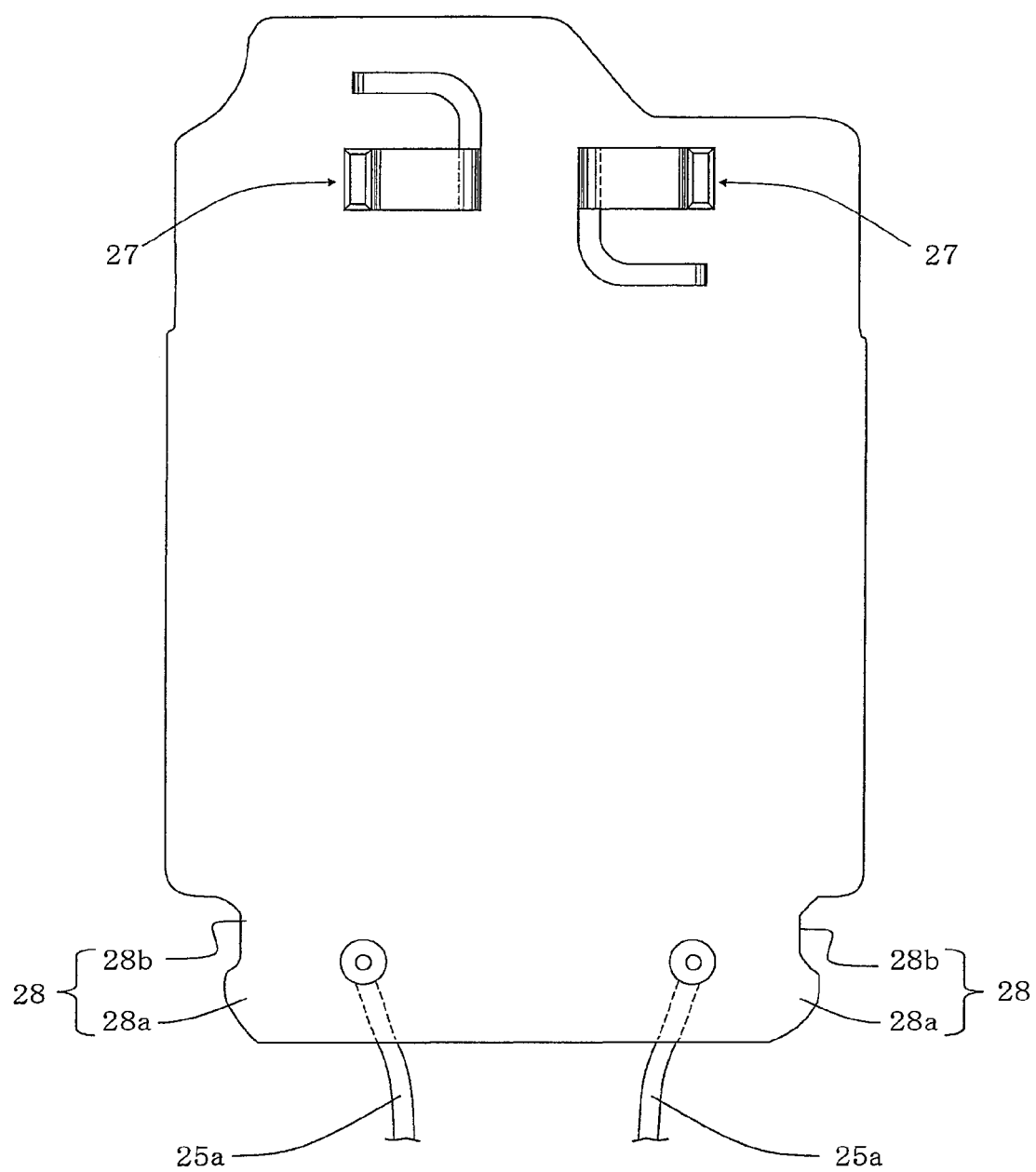
FIG. 5 is a front view showing a surface of a circuit board used in a motor assembly according to an embodiment of the present invention, on which electrode terminals are provided.

As shown in FIG. 5, the circuit board 25 is formed in, for example, a substantially rectangle shape as viewed in a plan view as a whole. The circuit board 25 has an end side in a longitudinal direction, on which the pair of electrode terminals 27, 27 are disposed and arranged in parallel to each other in a width direction of the circuit board 25. A notched portion 28 is formed on each of the corners of the other end side in the longitudinal direction of the circuit board 25.

Each of the notched portions 28 is made by cutting out the circuit board 25 itself, that is to say, is formed by an engagement tab 28a which is placed far from the opposite end in which the pair of electrode terminals 27, 27 are provided and a notched concave portion 28b which is placed near the opposite end of the circuit board 25 so as to abut the engagement tab 28a.

Each of the engagement tabs 28a is projected outwardly in the width direction of the circuit board 25, and each of the notched concave portion 28b is notched inwardly in the width direction of the circuit board 25.

Figure 6:
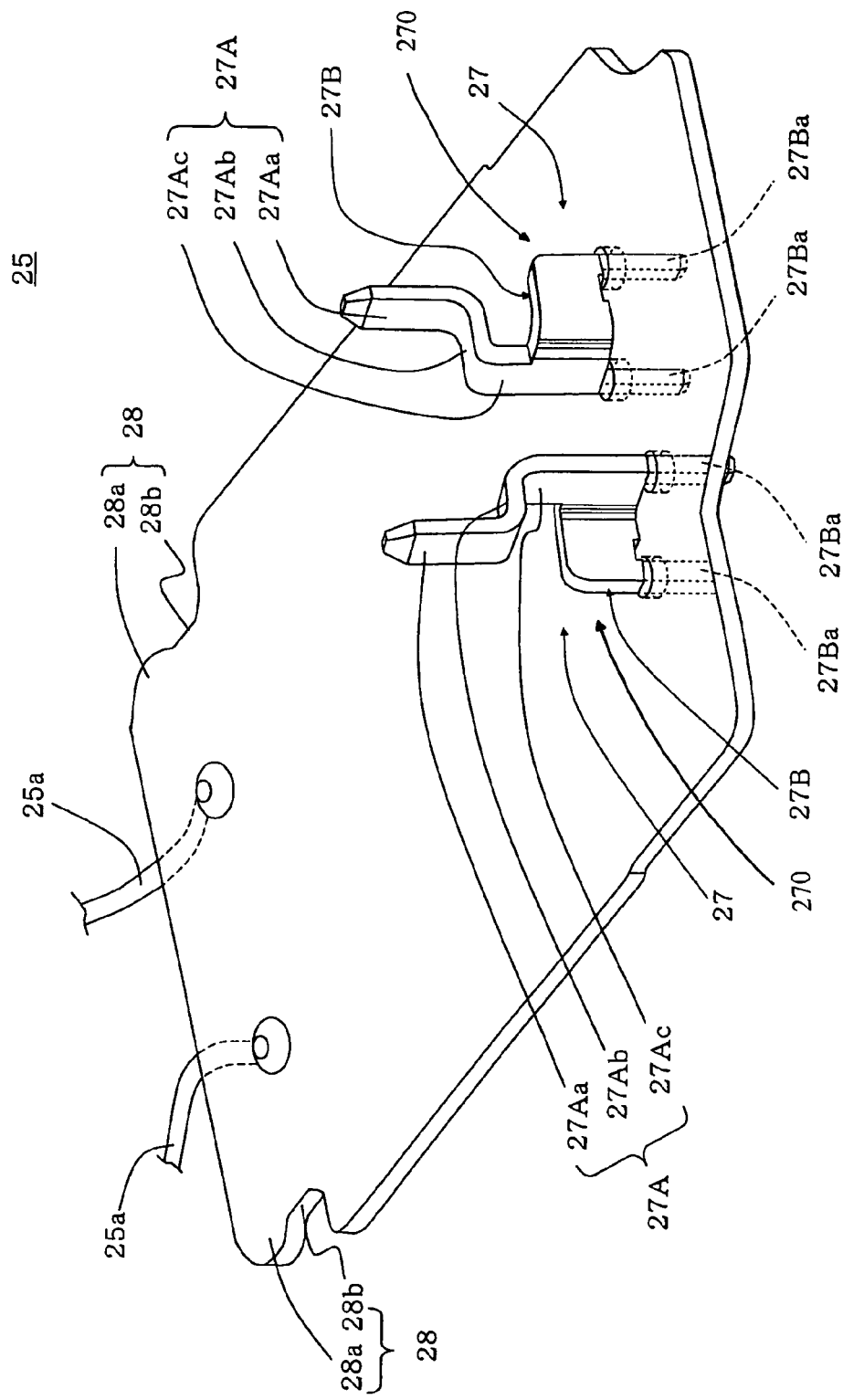
FIG. 6 is a perspective view showing a surface of a circuit board used in a motor assembly according to an embodiment of the present invention, on which electrode terminals are provided.

FIG. 6 shows an example of a structure of the electrode terminals 27, 27. Each of the electrode terminals 27, 27 has a plug unit engagement portion 270 which is configured to be engaged with a supporting member engagement portion (described below). The plug unit engagement portion 270 includes a crank portion 27A and a curved base portion 27B, as may be seen in FIG. 6.

The crank portion 27A has a plug portion 27Aa, a stopped portion 27Ab, and a stand portion 27Ac.

The stopped portion 27Ab is formed at a middle of the crank portion 27A so that the electrode terminal 27 is formed in a crank shape at large.

The stopped portion 27Ab is formed to extend parallel to the circuit board 25 from an end of the plug portion 27Aa. The stand portion 27Ac is formed to extend vertically to the circuit board 25 from an end of the stopped portion 27Ab to be connected to a top portion of the curved base portion 27B.

Each of the curved base portions 27B is provided with a pair of terminal portions 27Ba, 27Ba. Each of the terminal portions 27Ba is inserted in a fitting hole provided on the circuit board 25 to be joined on the circuit board 25.

Each of the plug portions 27Aa extends parallel to the thickness direction of the circuit board 25 and is configured to be fitted in each of the electrode socket portions 24d.

Figure 7:
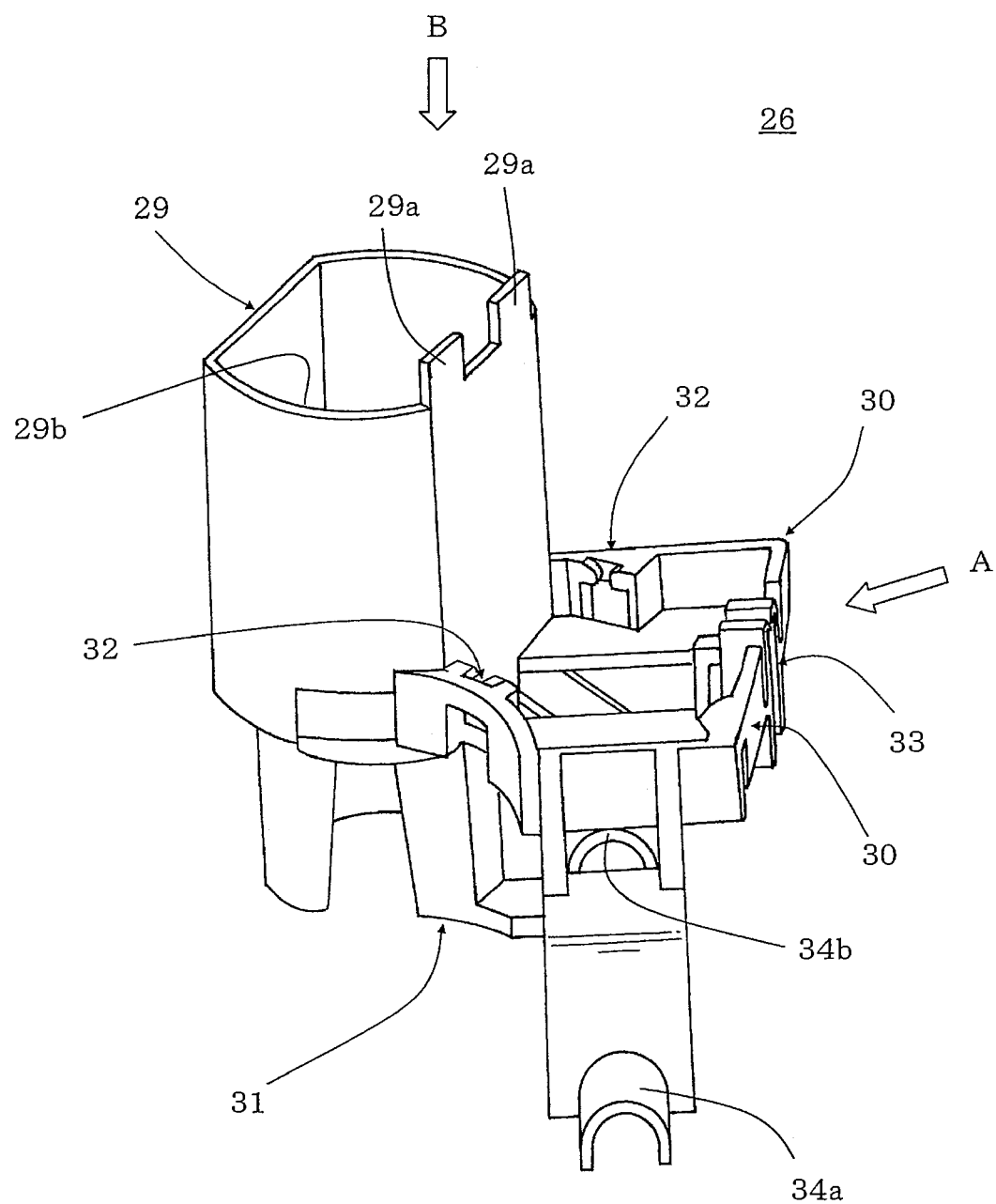
FIG. 7 is a perspective view showing a supporting member used in a motor assembly according to an embodiment of the present invention.
Figure 8:
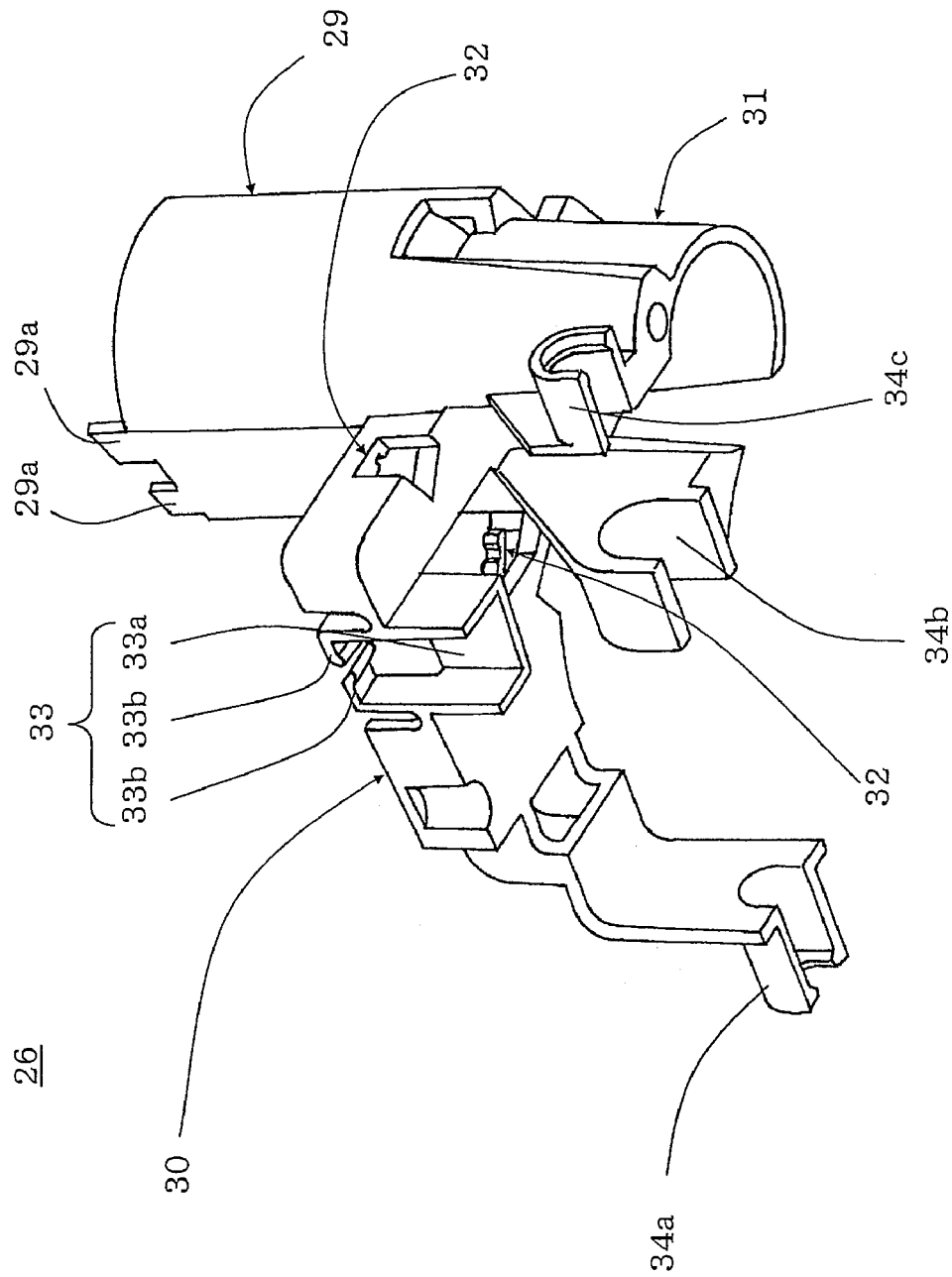
FIG. 8 is a perspective view showing a supporting member used in a motor assembly according to an embodiment of the present invention, viewed from a direction of an arrow A shown in FIG. 7.
Figure 9:
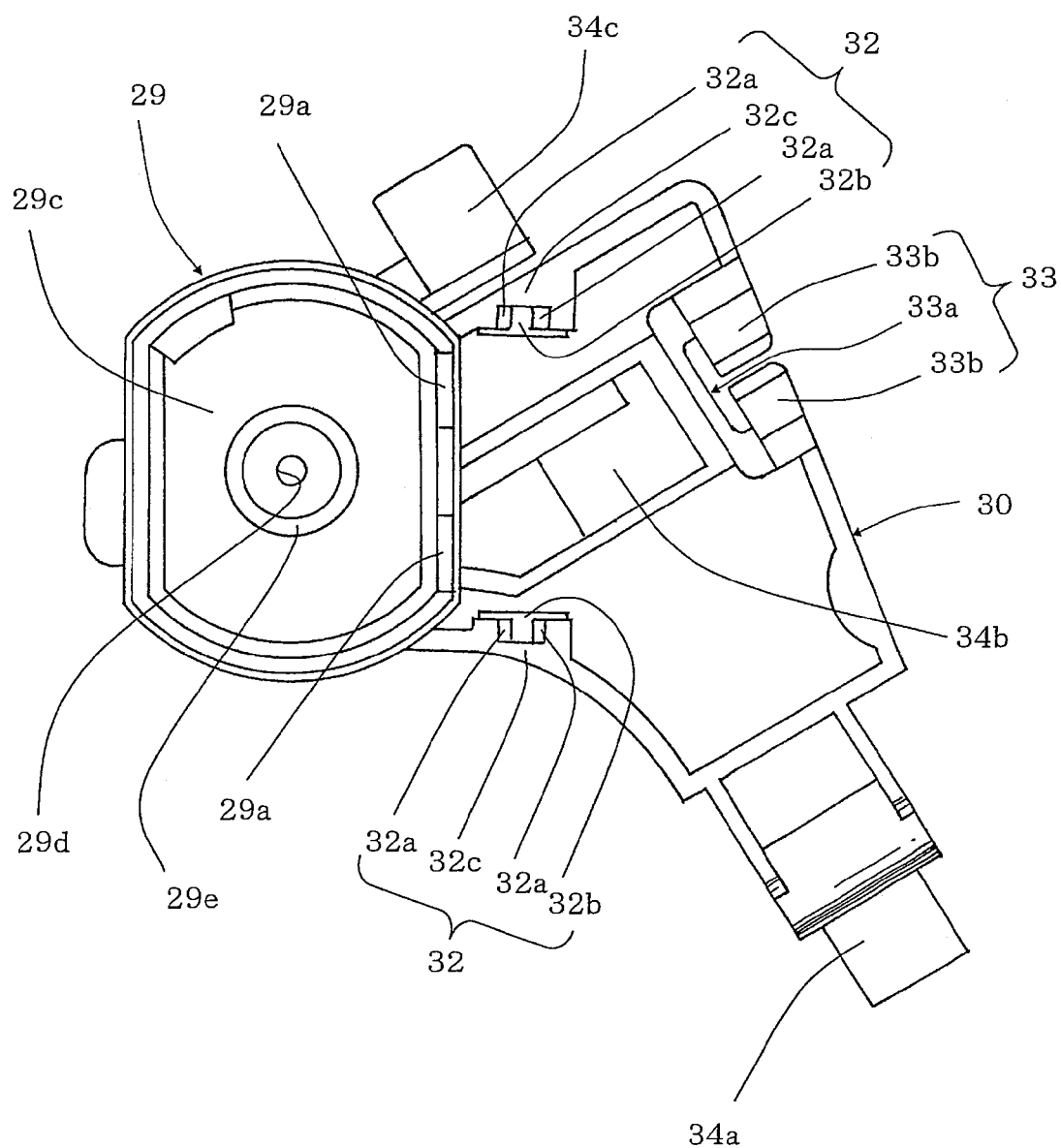
FIG. 9 is a front view showing a supporting member forming a motor assembly according to an embodiment of the present invention, viewed from a direction of an arrow B shown in FIG. 7.

FIGS. 7 to 9 show the supporting member 26. The supporting member 26 according to an embodiment of the present invention has a board supporting portion to support the circuit board, a motor supporting portion to support the motor, and the above-mentioned supporting member engagement portion which is engaged with the plug unit engagement portion of the plug unit. The supporting member 26 may be formed by a motor insertion portion 29, corresponding to the motor supporting portion, base portion 30, corresponding to the board supporting portion, and a worm gear insertion portion 31.

The supporting member 26 having slight flexibility is made of a resin product produced by being molded in an integral molding state.

The motor 24 is capable of being inserted in a drive axis direction of the motor into the motor insertion portion 29. The circuit board 25 is capable of being fitted on the base portion 30 to be supported.

The motor insertion portion 29 is formed, for example, in a tubular shape, and the supporting member engagement portion is provided on an end of an insertion opening 29b of the tubular motor insertion portion 29. The supporting member engagement portion 290, as may be seen in FIG. 4, is formed by a pair of plug stop projections 29a, 29a provided so as to extend in an opposite direction to the inserting direction of the motor 24.

Figure 13:
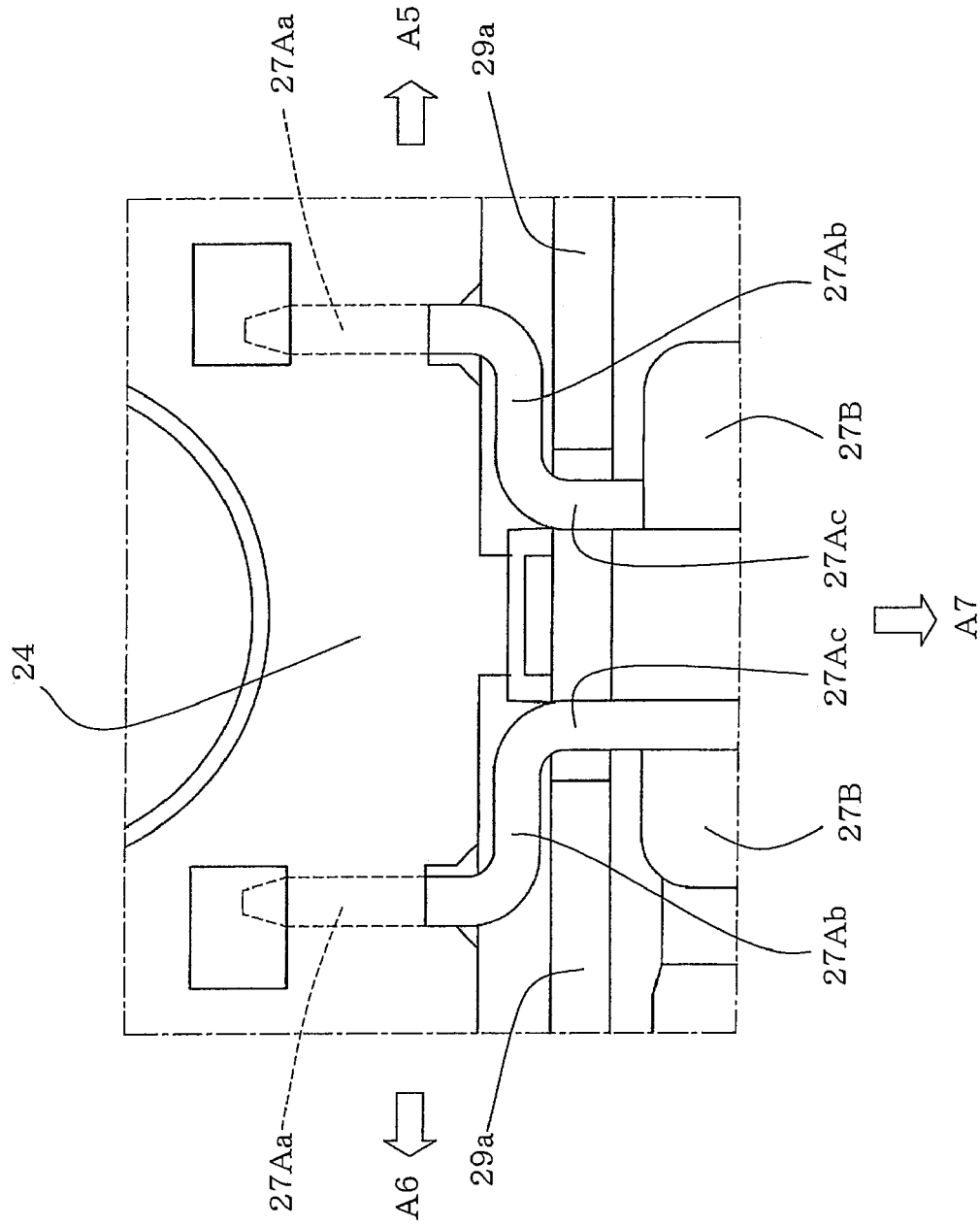
FIG. 13 is an enlarged view of D part shown in FIG. 12.

The plug unit engagement portion is engaged with the supporting member engagement portion when the plug unit is fitted in the socket unit. As shown in FIG. 13, the plug stop projections 29a, 29a stop the stand portions 27Ac, 27Ac of the electrode terminals 27, 27 in an engaged state by clipping the stand portions 27Ac, 27Ac from both sides of the electrode terminals in the width direction of the circuit board 25.

The stopped portions 27Ab, 27Ab are stopped in an engaged state by the plug stop projections 29a, 29a, respectively, so that the electrode terminals are prevented from being withdrawn from the motor 24.

As shown in FIG. 9, a stop wall 29c is provided on an inside end of the tubular motor insertion portion 29 corresponding to a front end of the motor 24 in the inserting direction of the motor 24. A shaft hole 29d in which the driving shaft 24a of the motor 24 is inserted is provided on the stop wall 29c. An abutting ring 29e is provided on a circumference of the shaft hole 29d.

The base portion 30 of the supporting member 26 is provided with slit portions 32, 32, a harness holding portion 33, and a worm gear bearing portion 34a.

The worm gear insertion portion 31 is also provided with worm gear bearing portions 34b, 34c.

As shown in FIG. 8, each of the worm gear bearing portions 34a, 34b, 34c is formed in a semi-cylindrical shape, and extends downwardly from the base portion 30 to support, from above, the shaft 21a of the worm gear 21, which is a part of the power transmission mechanism.

As shown in FIG. 9, the pair of slit portions 32, 32 are placed at an interval to each other, and the interval corresponds to a width of the circuit board 25.

Each of the slit portions 32 is formed by guide slits 32a, 32a, a space 32b, and a latch portion 32c.

The pair of slit portions 32, 32 are engaged with a front end portion of the circuit board 25 in an inserting direction of the circuit board 25 from both sides of the circuit board 25.

Figure 11:
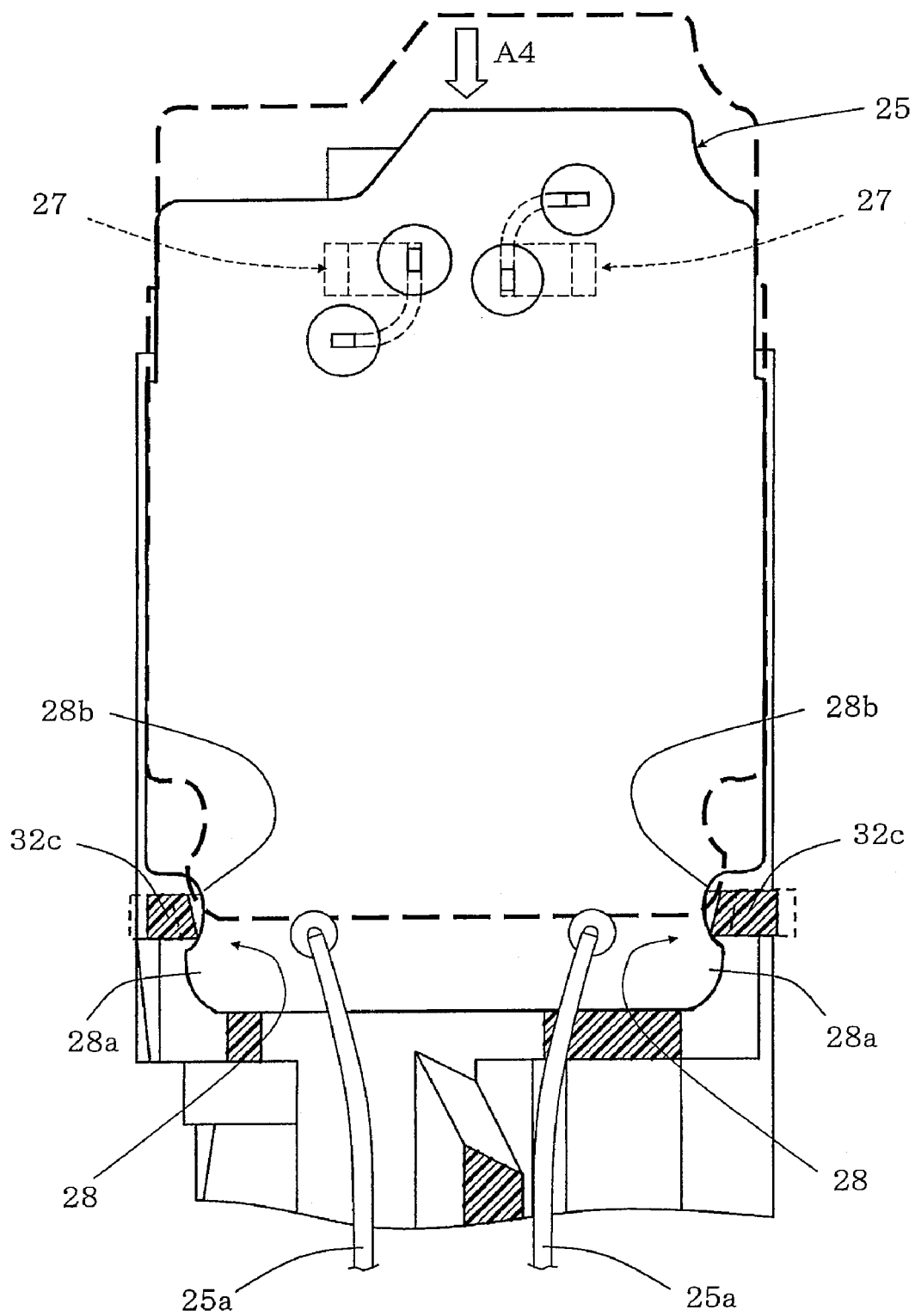
FIG. 11 is a section view along A-A line shown in FIG. 3 illustrating an engaged state of a circuit board.

When mounting the circuit board on the supporting member 26, each of the notched portions 28 (see FIG. 5) of the circuit board 25 is guided to pass between the pair of guide slits 32a, 32a. Then, each of the engagement tabs 28a passes over the corresponding latch portions 32c so that the latch portions 32c are fitted in the notched concave portions 28b, as shown in FIG. 11. Thereby, the circuit board 25 is prevented from being withdrawn in an opposite direction to the inserting direction of the motor 24.

As shown in FIG. 9, the harness holding portion 33 is formed at an opposite side from the motor insertion portion 29 across the slit portions 32, 32. The harness holding portion 33 has a harness protecting space 33a and a pair of harness guiding tabs 33b, 33b.

The harness protecting space 33a is configured to receive the lead wires 25a, 25a connected to the circuit board 25, and the pair of harness guiding tabs 33b, 33b guide the lead wires 25a, 25a to the harness protecting space 33a and retain the harnesses in the harness protecting space 33a to prevent the harnesses from being withdrawn.

The harness protecting space 33a extends in the inserting direction of the motor 24, and the pair of harness guiding tabs 33b, 33b extend from a pair of side walls forming the harness protecting space 33a so that a small space is formed between the harness guiding tabs 33b, 33b.

The lead wires 25a, 25a are guided through the small space to the harness protecting space 33a, and then stopped with the harness guiding tabs 33b, 33b. Consequently, even when the lead wires 25a, 25a are moved, the movement of the lead wires 25a, 25a is inhibited so that the movement is not transmitted to a joining portion between the circuit board 25 and the lead wires 25a, 25a.

(Assembling Method of Motor Assembly)

FIG. 10 shows an example of an assembling method of the motor assembly according to an embodiment of the present invention. The electrode terminals 27, 27 of the circuit board 25 are fitted in the electrode socket portions 24d, 24d (see FIG. 4) of the motor 24, respectively, as shown by arrow A1 in FIG. 10.

The circuit board 25 and the motor 24 are disposed parallel to each other and are connected to each other via a space therebetween.

Figures 10A, 10B, 10C:
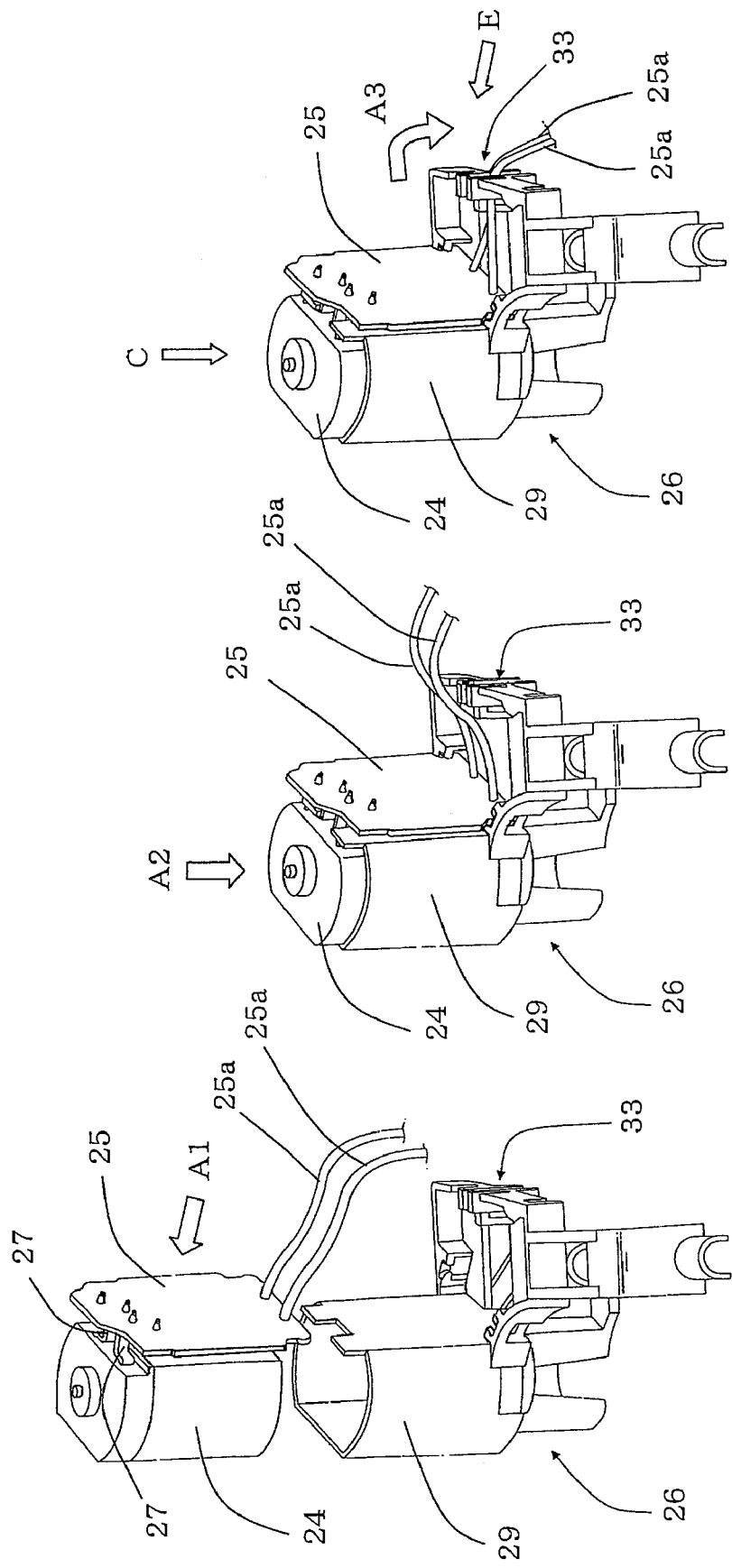
FIG. 10A is a view illustrating an assembling method of a motor assembly according to an embodiment of the present invention.
FIG. 10B is a view illustrating an assembling method of a motor assembly according to an embodiment of the present invention.
FIG. 10C is a view illustrating an assembling method of a motor assembly according to an embodiment of the present invention.

Then the motor 24 is inserted in the motor insertion portion 29 of the supporting member 26 as shown by arrow A2 in FIG. 10B.

The motor 24 is inserted in the motor insertion portion 29 until the motor 24 is stopped by the abutting ring 29e.

As shown in FIG. 11, just before the motor 24 abuts the abutting ring 29d, the notched portions 28, 28 of the circuit board 25 are guided by the guide slits 32a, 32a so that each of the latch portions 32c is pressed to opposite sides in the inserting direction of the circuit board 25 by the corresponding engagement tab 28a.

After each of the engagement tabs 28a passes over the corresponding latch portion 32c, each of the latch portions 32c recovers in an initial state to be engaged with the corresponding notched concave portion 28b of the notched portion 28.

Figure 12:
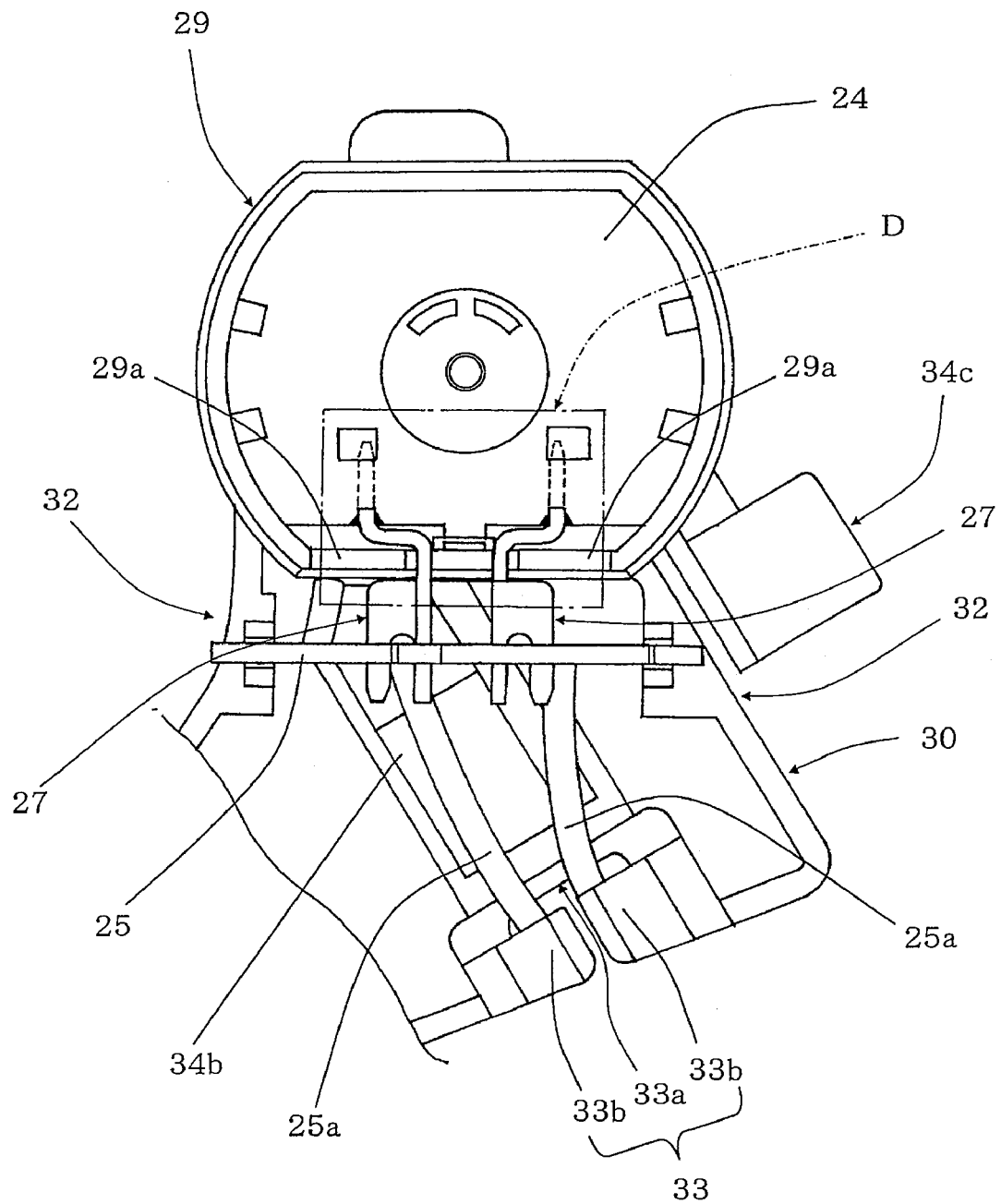
FIG. 12 is a view showing an upper surface of a motor assembly according to an embodiment of the present invention viewed from a direction of an arrow C shown in FIG. 10C.

At this time, as shown in FIGS. 12 and 13, each of the stand portions 27Ac of the pair of electrode terminals 27, 27 is inserted between the pair of the plug stop projections 29a, 29a of the motor insertion portion 29. The stopped portions 27Ab, 27Ab of the pair of the electrode terminals 27, 27 are disposed between the pair of plug stop projections 29a, 29a and the motor 24 and then the plug unit is prevented from being withdrawn from the motor 24.

Consequently, the circuit board 25 and the motor 24 are disposed at an interval, connected to each other, and fixed together to the supporting member 26.

Figure 14:
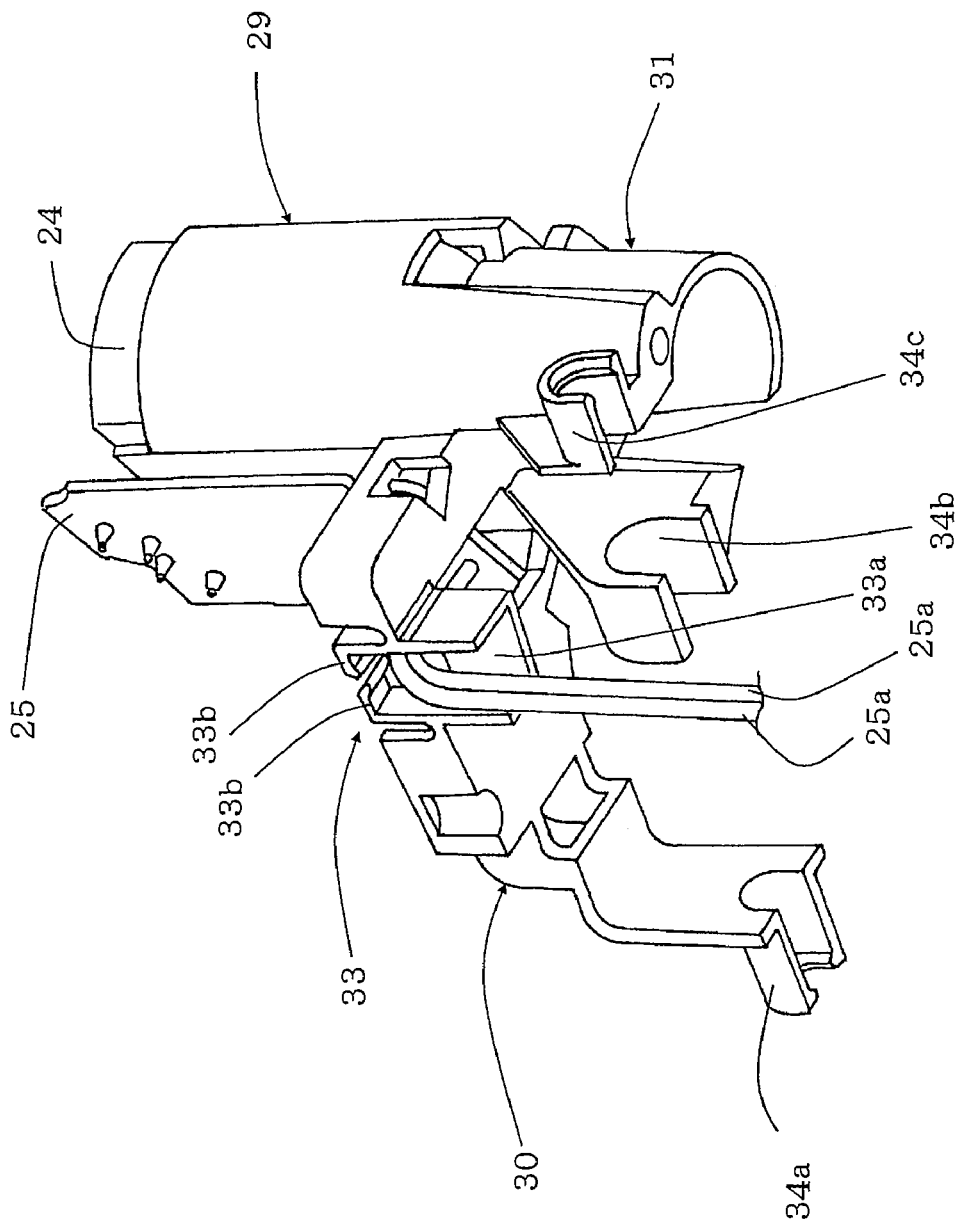
FIG. 14 is a perspective view illustrating a harness holding portion, viewed from a direction of an arrow E shown in FIG. 10C.

As shown in FIGS. 10C and 14, the lead wires 25a, 25a are inserted between the harness guiding tabs 33b, 33b of the harness holding portion 33 to be disposed along the harness protecting space 33a (see arrow A3 in FIG. 10C) so that the assembling of the motor assembly 7 is completed.

(Operations and Effects)

In a case where the circuit board 25 is engaged with the slit portions 32, 32 in a state in which the circuit board 25 and the motor 24 are engaged with each other via the pair of electrode terminals 27, 27 to be connected to each other, the circuit board 25 is prevented from being withdrawn in the inserting direction of the motor 24 (see the direction of arrow A4 in FIG. 11) so that the motor is prevented from being withdrawn from the motor insertion portion 29 via the circuit board 25.

Thereby, since the motor 24 is fixed on the motor insertion portion 29 only by a fit of the electrode terminals 27, 27 to the electrode socket portions 24d, 24d and an engagement of the circuit board 25 with the slit portions 32, 32, the motor can be easily fixed on the supporting member 26 without any fixing members such as screws or the like so that the production cost can be prevented from increasing.

In a case where the circuit board 25 and the motor 24 are connected to each other via the pair of electrode terminals 27, 27 and the motor 24 is inserted in the motor insertion portion 29, the pair of electrode terminals 27, 27 are stopped in a engaged state with the pair of plug stop projections 29a, 29a by being clipped from both sides in the inserting direction of the motor 24. The circuit board 25 can be prevented from moving in a direction in which the plug stop projections 29a, 29a extend (see the direction of arrows A5, A6 in FIG. 13).

Furthermore, the motor 24 can be prevented from inversely rotating about the driving shaft 24a due to a reactive force of torque with the rotation of the driving shaft 24a of the motor 24.

In addition, in a case where the stopped portions 27Ab, 27Ab of the electrode terminals 27, 27 are stopped in an engaged state with the plug stop projections 29a, 29a, the electrode terminals 27, 27 can be prevented from being withdrawn from the motor 24 in the thickness direction of the circuit board 25 (see arrow A7 in FIG. 13) so that power distribution to the motor 24 can be steadily performed.

Since the electrode terminals 27, 27 are fixed on the circuit board 25, the circuit board 25 is not withdrawn from the motor 24. The circuit board 25 and the motor 24 can be steadily fixed together to the supporting member 26 by cooperation of a fixation of the circuit board 25 to the motor 24 by the plug stop projections 29a, 29a, and an engagement of the circuit board 25 with the supporting member 26 by the slit portions 32, 32.

Since the motor 24 and the circuit board 25 are mounted on the supporting member 26 only by the fit and the engagement of the plug unit and the like, the assembling of the motor assembly can be easily performed without fixing members such as screws or the like so that the production cost can be prevented from increasing.

In a case where the supporting member 26 is provided with the harness holding portion 33 having the harness protecting space 33a configured to receive the lead wires 25a, 25a extending from the circuit board 25 and the harness guiding tabs 33b, 33b configured to stop in an engaged state the lead wires 25a, 25a, even when the lead wires 25a, 25a are moved, the lead wires 25a, 25a are stopped in an engaged state so that a force is not transmitted to the joint portion of the lead wires 25a, 25a and the circuit board 25. Therefore, the lead wires 25a, 25a and the circuit board 25 at the joint portion thereof can be protected.

Since the lead wires 25a, 25a are stopped in an engaged state in the harness guiding tabs 33b, 33b, the lead wires 25a, 25a are prevented from being inserted in the cases 8A, 8B, so that a length of the lead wires withdrawn outside the cases 8A, 8B can be made stable.

As shown in FIGS. 5 and 6, in a case where the electrode terminals 27, 27 have the same structure, since the single electrode terminal 27 can be used for both electrodes, the production cost can be prevented from increasing, compared to a case where different members for the terminals are used for individual electrodes.

In a case where the motor assembly 7 according to an embodiment of the present invention is used for the outer mirror driving apparatus 5 which drives the outer mirror 1 for a vehicle, a part of a process for production of the mirror can be simplified so that operating efficiency can be improved. After the motor assembly 7 is assembled in the outer mirror driving apparatus 5, a stably fixed structure against vibration when the vehicle is driven can be achieved.

Although the preferred embodiments of the present invention have been described, it should be noted that the present invention is not limited to these embodiments, and various changes and modifications can be made to the embodiments.

In addition, any shape or form of the motor and the motor insertion portion can be used. For example, the case of the motor may have a substantially cylindrical shape in appearance and the motor insertion portion may have a cylindrical shape.

Although a case in which the motor assembly is used in the outer mirror driving apparatus for an outer mirror of a vehicle is described in the above embodiment, the motor assembly is not limited to be used in a driving apparatus for an outer mirror of a vehicle, for example, the motor assembly can be used in an outer mirror driving apparatus for an outer or inner mirror of trucks, automobiles, or the like.

According to an embodiment of the present invention, since the circuit board is engaged with the slit portion in a state where the circuit board and the motor are connected to each other via the pair of electrode terminals, the circuit board is prevented from being withdrawn in the inserting direction of the motor so that the motor is prevented from being withdrawn via the circuit board.

Thereby, since the motor is fixed on the motor insertion portion only by the fit of the electrode terminals and the electrode sockets and the engagement of the circuit board and the slit portion, the motor can be easily fixed on the supporting member without fixing members such as screws or the like so that the production cost can be prevented from increasing.

According to an embodiment of the present invention, since the circuit board and the motor are connected to each other via the pair of electrode terminals and the pair of electrode terminals are stopped in an engaged state by being clipped from both sides of the inserting direction of the motor in a state where the motor is inserted in the motor insertion portion, the circuit board can be prevented from moving in a direction where the pair of stop projections extend.

Furthermore, the motor can be prevented from inversely rotating about the driving shaft due to a reactive force of torque with the rotation of the driving shaft of the motor.

According to an embodiment of the present invention, since the curved portion of the electrode terminal is stopped in an engaged state by the stop projection, the electrode terminal is prevented from being withdrawn from the motor in the thickness direction of the circuit board so that the power distribution to the motor can be steadily performed.

Since the electrode terminals are fixed on the circuit board, the circuit board is not withdrawn from the motor. The circuit board and the motor can be steadily fixed on the supporting member by cooperation of a fixation of the circuit board to the motor by the stop projections, and an engagement of the circuit board with the supporting member by the slit portions.

Since the motor and the circuit board are mounted on the supporting member only by the fit and the engagement of the plug unit and the like, the assembling of the motor assembly can be easily performed without fixing members such as screws or the like so that the production cost can be prevented from increasing.

According to an embodiment of the present invention, since the supporting member is provided with the harness holding portion having the harness protecting space configured to receive harnesses extending from the circuit board and the harness guiding tabs configured to stop the harnesses in an engaged state, even when the harnesses are moved, the harnesses are stopped in an engaged state so that a force is not transmitted to the joint portion of the harnesses and the circuit board. Therefore, the harnesses and the circuit board at the joint portion thereof can be protected.

According to an embodiment of the present invention, since the motor assembly is used in the outer mirror driving apparatus, which drives the outer mirror for a vehicle, a part of a process for production of the mirror can be simplified so that the operating efficiency can be improved. After the motor assembly is assembled in the outer mirror driving apparatus, a stably fixed structure against vibration when the vehicle is driven can be achieved.

What is claimed is:

1. A motor assembly, comprising:
   a motor;
   a circuit board on which a control circuit to control the motor and a plug unit are mounted; and
   a supporting member which supports the motor and the circuit board;
   wherein the motor is provided with a socket unit in which the plug unit is fitted;
   wherein the supporting member has a board supporting portion to support the circuit board, a motor supporting portion formed together with the board supporting portion and configured to support the motor, and a pair of plug stop projections, the pair of plug stop projections being provided together with the motor supporting portion and configured to stop the plug unit in an engaged state from both sides of the plug unit in a width direction of the circuit board;
   wherein the plug unit has a plug unit engagement portion which is engaged with the pair of plug stop projections; and
   wherein the plug unit engagement portion of the plug unit mounted on the circuit board is engaged with the pair of plug stop projections in a state where the plug unit is fitted in the socket unit.

2. The motor assembly according to claim 1, wherein the circuit board is disposed in a direction parallel to a drive axis direction of the motor, and the plug unit extends in a thickness direction of the circuit board.

3. The motor assembly according to claim 1, wherein the motor supporting portion is formed in a tubular shape extending in a drive axis direction of the motor.

4. The motor assembly according to claim 1, wherein the board supporting portion has a pair of slit portions which are disposed so as to be engaged with both corners of an end of the circuit board.

5. The motor assembly according to claim 1, wherein the plug unit engagement portion has curved portions.

6. The motor assembly according to claim 1, wherein the supporting member includes a harness holding portion having a harness protecting space which receives harnesses connected to the circuit board and a pair of harness guiding tabs which guide the harnesses to the harness protecting space and retain the harnesses in the harness protecting space.

7. The motor assembly according to claim 1, used in an outer mirror driving apparatus for a vehicle mirror.

8. A motor assembly, comprising
- a motor;
- a circuit board on which a control circuit to control the motor and a plug unit are mounted; and
- a supporting member which supports the motor and the circuit board;
- wherein the motor is provided with a socket unit in which the plug unit is fitted;
- wherein the supporting member has a board supporting portion to support the circuit board, a motor supporting portion to support the motor, and a supporting member engagement portion formed by a pair of plug stop projections which are provided together with the motor supporting portion and configured to stop the plug unit in an engaged state from both sides of the plug unit in a width direction of the circuit board;
- wherein the plug unit has a plug unit engagement portion which is engaged with the supporting member engagement portion; and
- wherein the plug unit engagement portion supporting member engagement portion when the plug unit is fitted in the socket unit.

9. A motor assembly, comprising:
- a motor;
- a circuit board on which a control circuit to control the motor and a plug unit are mounted; and
- a supporting member which supports the motor and the circuit board;
- wherein the motor is provided with a socket unit in which the plug unit is fitted;
- wherein the supporting member has a board supporting portion to support the circuit board, a motor supporting portion to support the motor, and a supporting member engagement portion;
- wherein the plug unit has a plug unit engagement portion which is engaged with the supporting member engagement portion;
- wherein the plug unit engagement portion is engaged with the supporting member engagement portion in a state where the plug unit is fitted in the socket unit; and
- wherein the board supporting portion has a pair of slit portions which are disposed so as to be engaged with both corners of an end of the circuit board.

* * * * *